(12) United States Patent
Hornkvist

(10) Patent No.: US 7,720,860 B2
(45) Date of Patent: May 18, 2010

(54) QUERY RESULT ITERATION

(75) Inventor: John Martin Hornkvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 11/760,707

(22) Filed: Jun. 8, 2007

(65) Prior Publication Data

US 2008/0306912 A1 Dec. 11, 2008

(51) Int. Cl.
*G06F 17/30* (2006.01)
(52) U.S. Cl. .................. 707/769; 707/705; 707/765
(58) Field of Classification Search .............. 707/3, 707/1, 769, 765, 705
See application file for complete search history.

(56) References Cited

U.S. PATENT DOCUMENTS

2006/0069982 A1* 3/2006 Petriuc ............... 715/500
2008/0059420 A1* 3/2008 Hsu et al. .............. 707/3
2008/0114730 A1* 5/2008 Larimore et al. ......... 707/3

* cited by examiner

*Primary Examiner*—Mohammad Ali
*Assistant Examiner*—Thuy (Tiffany) Bui
(74) *Attorney, Agent, or Firm*—Blakely, Sokoloff, Taylor & Zafman LLP

(57) ABSTRACT

Systems and methods for processing an index are described. A pulse in an inverted index refers to a group of items that do not occur in any other pulse in the index. When processing a query against an inverted index in which pulses are present, the query is processed against a single pulse. The end of the pulse is determined based on the characteristics of the pulse and the linked list nodes that comprise the postings lists from which the index was generated. In some embodiments, index updates are applied to the query result obtained from a single pulse to provide an efficient and up to date query result.

15 Claims, 5 Drawing Sheets

QUERY RESULT ITERATION

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching not only the content of a file, but also by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. This search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. Some file management systems, such as the Finder program, allow users to find a file by searching through the metadata.

In a typical system, the various content, file, and metadata are indexed for later retrieval using a program such as the Finder program, in what is commonly referred to as an inverted index. For example, an inverted index might contain a list of references to documents in which a particular word appears. Given the large numbers of words and documents in which the words may appear, an inverted index can be extremely large. The size of an index presents many challenges in processing and storing the index, such as updating the index or using the index to perform a search.

SUMMARY OF THE DETAILED DESCRIPTION

Methods and systems for processing an inverted index in a data processing system are described herein.

According to one aspect of the invention, a method for querying an index is described in which the query is run against one pulse in the index in the absence of any marking to indicate where the pulse begins and ends. A pulse is formed when a postings list comprising a series of linked lists is flushed to disk. The method includes determining when the end of pulse has been reached based on certain characteristics of the linked list nodes and the pulses in which they are contained.

BRIEF DESCRIPTION OF THE DRAWINGS

The present invention is illustrated by way of example and not limitation in the figures of the accompanying drawings in which like references indicate similar elements.

DETAILED DESCRIPTION

The embodiments of the present invention will be described with reference to numerous details set forth below, and the accompanying drawings will illustrate the described embodiments. As such, the following description and drawings are illustrative of embodiments of the present invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2007.

Figure 1:
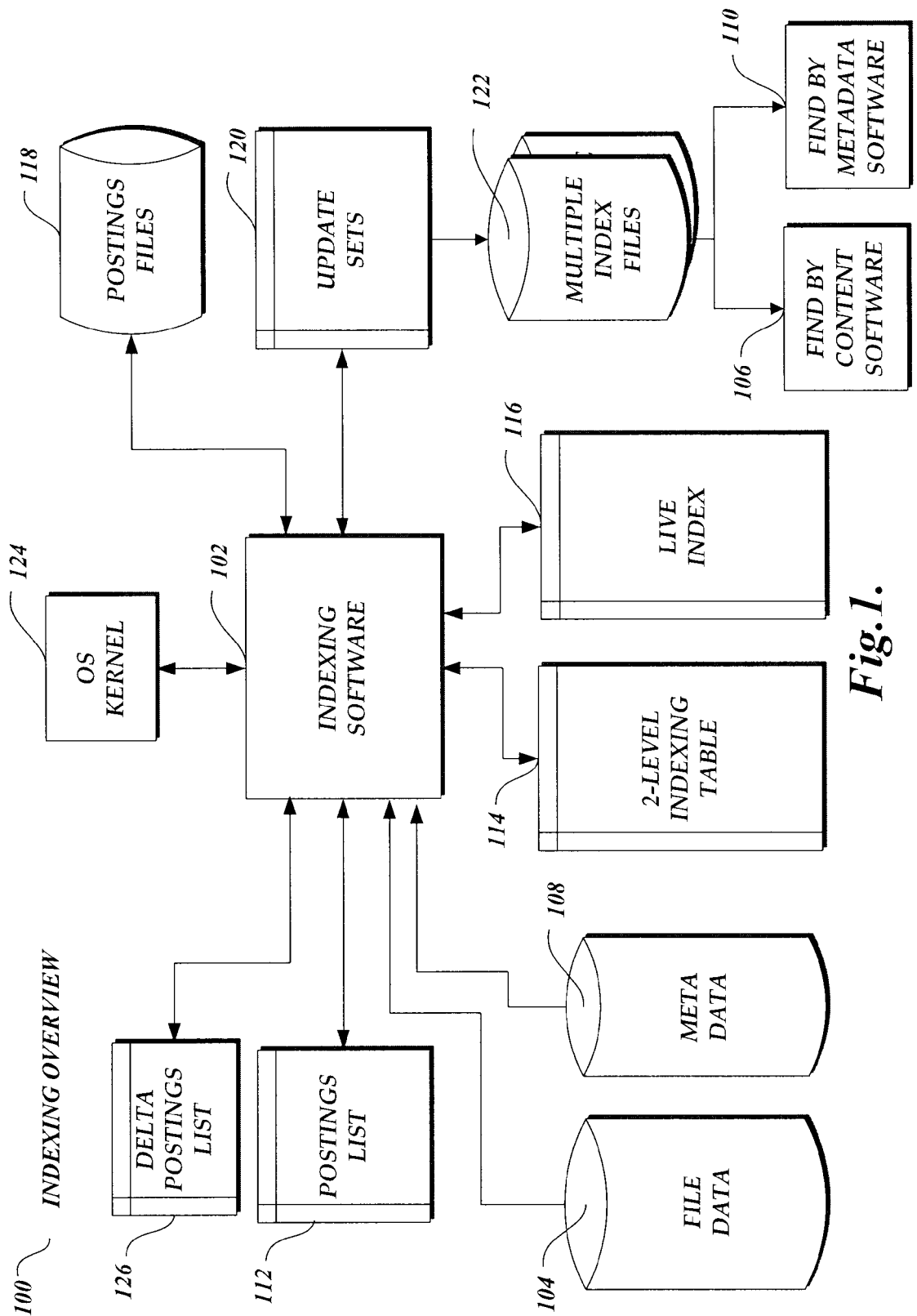
FIG. 1 is a block diagram overview of an architecture for processing an inverted index according to one exemplary embodiment of the invention.
Figure 5:
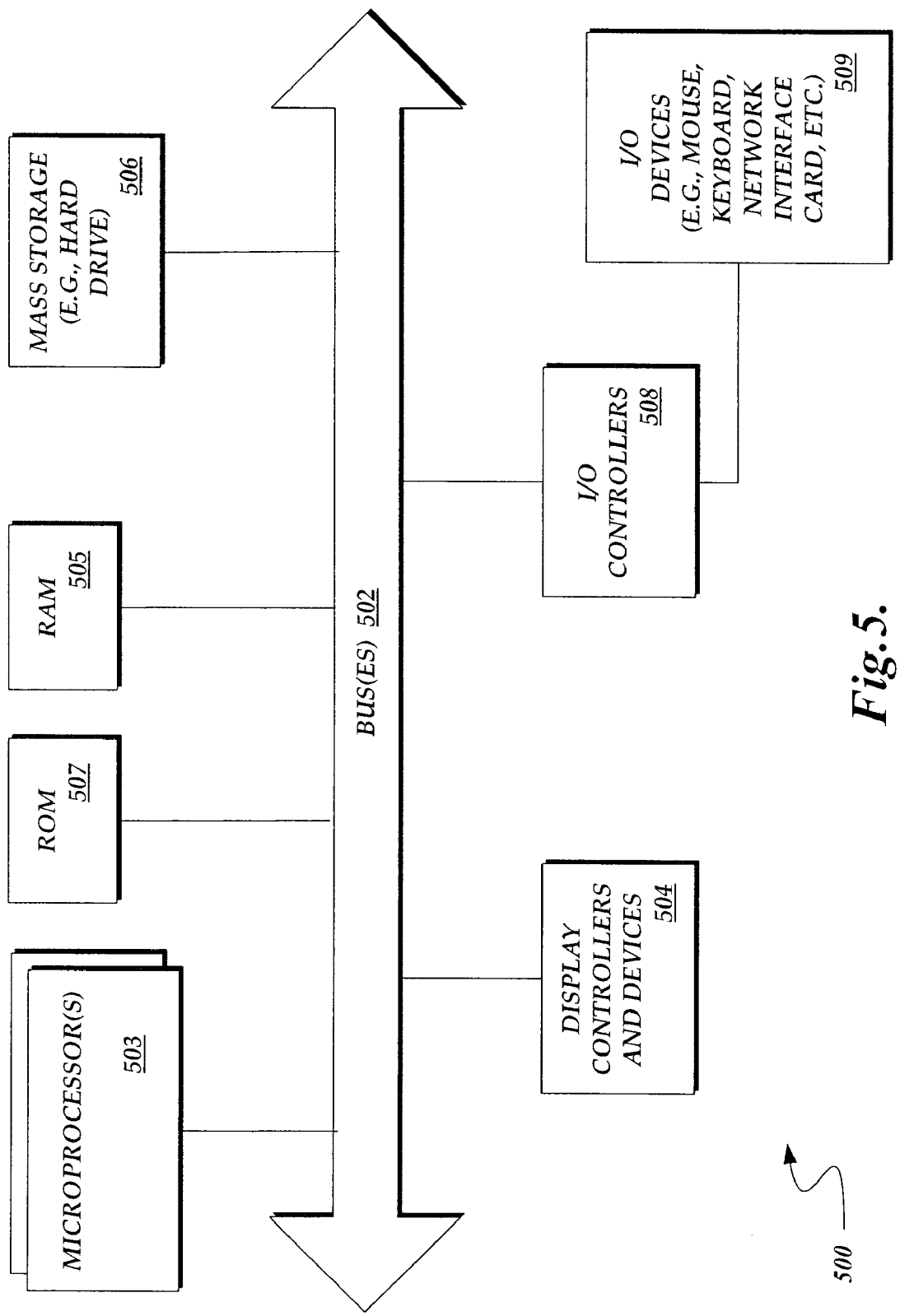
FIG. 5 is a block diagram overview of an exemplary embodiment of a data processing system, which may be a general purpose computer system and which may operate in any of the various methods described herein.

Various different software architectures may be used to implement the functions and operations described herein, such as to perform the method shown in FIG. 5. The following discussion provides one example of such an architecture, but it will be understood that alternative architectures may also be employed to achieve the same or similar results. The software architecture 100 shown in FIG. 1 is an example which is based upon the Macintosh operating system. The architecture 100 includes indexing software 102 and an operating system (OS) kernel 124 which is operatively coupled to the indexing software 102, as well as other software programs, such as find by content software 106 and find by metadata software 110 (which may be the Finder program referenced earlier), and other applications not shown.

In one exemplary embodiment, the find by content software 106 and/or the find by metadata software 110 is used to find a term present in the file data 104 or meta data 108. For example, the software 106/110 may be used to find text and other information from word processing or text processing files created by word processing programs such as Microsoft Word, etc.

The find by content software 106 and find by metadata software 110 are operatively coupled to databases which include one or more indexes 122. The indexes 122 represent at least a subset of the data files in a storage device, including file data 104 and meta data 108, and may include all of the data files in a particular storage device (or several storage devices), such as the main hard drive of a computer system. The one or more indexes 122 comprise an indexed representation of the content and/or metadata of each item stored on the data files 104/108, such as a text document, music, video, or other type of file. The find by content software 106 searches for a term in that content by searching through the one or more index files 122 to see if the particular term, e.g., a particular word, is present in items stored on data files 104 which have been indexed. The find by content software functionality is available through find by metadata software 110 which provides the advantage to the user that the user can search the indexes 122 for the content 104 within an item stored on the data files 104 as well as any metadata 108 that may have been generated for the item.

In one embodiment of the present invention, indexing software 102 is used to create and maintain the one or more indexes 122 that are operatively coupled to the find by content and metadata software applications 106/110. Among other functions, the indexing software 102 receives information obtained by scanning the file data 104 and meta data 108, and uses that information to generate a postings list 112 that identifies an item containing a particular term, or having metadata containing a particular term. As such, the postings list 112 is a type of inverted index that maps a term, such as a search term, to the items identified in the list. In a typical embodiment, the information obtained during the scan includes a unique identifier that uniquely identifies the item containing the particular term, or having metadata containing the term. For example, items such as a word processing or text processing file have unique identifiers, referred to as ITEMIDs. The ITEMIDs are used when generating the postings list 112 to identify those items that contain a particular term, such as the word "Apple." ITEMIDs identifying other types of files, such as image files or music files, may also be posted to the postings list 112, in which case the ITEMID typically identifies items having metadata containing a particular term.

In one embodiment, the indexing software 102 accumulates postings lists 112 for one or more terms into one or more update sets 120 and, from time to time, flushes the updates sets 120 into one or more index files 122. The postings lists 112 for one or more items may also be stored in a postings file 118. The indexing software 102 may employ one or more indexing tables 114 that comprise one or more term tables, including a two-level table that separates the more frequently occurring terms from the less frequently occurring terms. The tables 114 may also include a postings table that comprises one or more postings lists for the terms that are being indexed. In one embodiment, the indexing software may maintain a live index 116 to contain the most current index. In some cases, updates to an index may be generated in a delta postings list 126 that is a specially marked postings list that may be dynamically applied to an index 122, postings files 118, updates sets 120, or other forms of an index in order to insure that the most current information is returned whenever those indexes are accessed.

Figure 2:
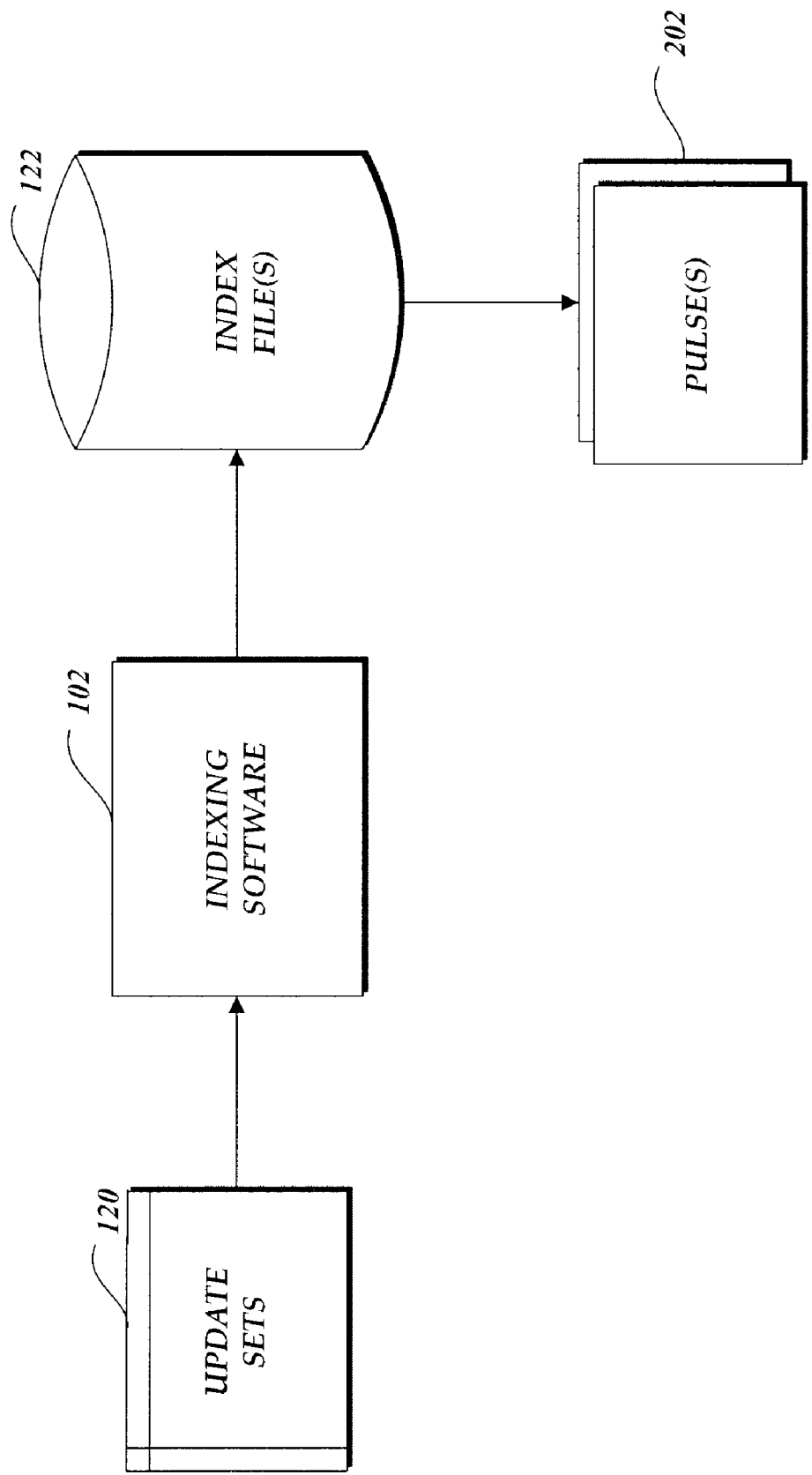
FIG. 2 is a block diagram illustrating one aspect of querying an index according to one exemplary embodiment of the invention.

FIG. 2 is a block diagram illustrating one aspect of querying an index according to one exemplary embodiment of the invention. A postings list of a single term is stored as a linked list of one or more nodes, where each node represents an item ID of an item containing the term. As illustrated in FIG. 2, indexing software 102 flushes an update set 120 comprising postings lists for several terms to an index file 122 on disk. As a result, a pulse 202 is formed on the disk in which an item id occurring in the pulse cannot occur in any other pulse on the disk.

When running a query against an index 122 containing pulses 202, such as that illustrated in FIG. 2, it would be helpful to restrict the query to just one pulse, so that the query would run more efficiently and so that any updates, typically from a live index or from a delta postings list, could be applied to the query result obtained from just one pulse.

Unfortunately, there is no marking or indication in the index to indicate where one pulse ends and another begins. Embodiments of the present invention overcome this problem by taking into consideration the characteristics of a pulse and the nodes that comprise them.

Figure 3:
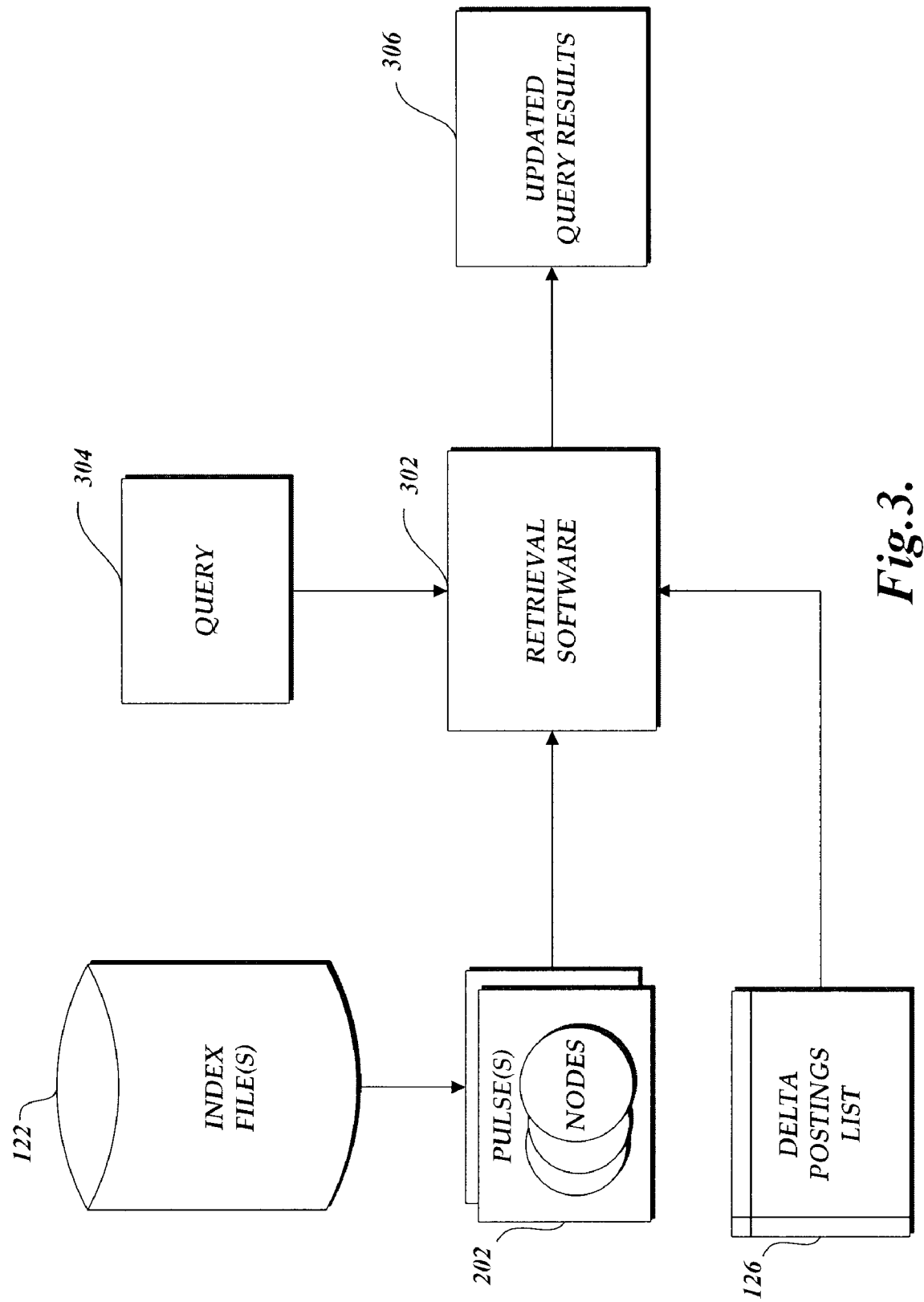
FIG. 3 is a block diagram illustrating another aspect of querying an index according to one exemplary embodiment of the invention.

FIG. 3 is a block diagram illustrating one aspect of querying an index according to one exemplary embodiment of the invention. When a pulse is formed, it is comprised of linked list nodes, and each linked list node can only correspond to one pulse. In addition, when the postings list was created (prior to being flushed to disk), each node in the linked list was updated to point only to older nodes, i.e., nodes representing items already in the postings list. Because each node only points to older nodes, which are logically ahead in the index, there is said to be a "closest next node." The closed next node is a node that is pointed to from a node in the current pulse.

When running the query 304 against the index 122, retrieval software 302 generates a sorted queue of nodes that contain the desired term. During processing the sorted queue of nodes, the end of the pulse can be detected when the next node in the queue is equal to the closest next node, i.e. is a node that is pointed to from a node in the current pulse.

Generally, it cannot be determined whether more than one pulse 202 has already been processed. In the typical case, it is more likely that a group of pulses has been processed, and likely that at least one partial pulse has been processed. As a result, before the processing of a pulse is finalized, it is necessary to either detect one more pulse, or have no more nodes to process.

To finalize the processing of a pulse, retrieval software 302 keeps track of the range of item ids occurring in a single pulse, and processes item ids up to the highest item id in the current pulse. Any updates, such as updates from a live index or a delta postings list 126 may be applied to the query result 306 when the end of a pulse has been reached, or when a matching item id is reached.

Figure 4:
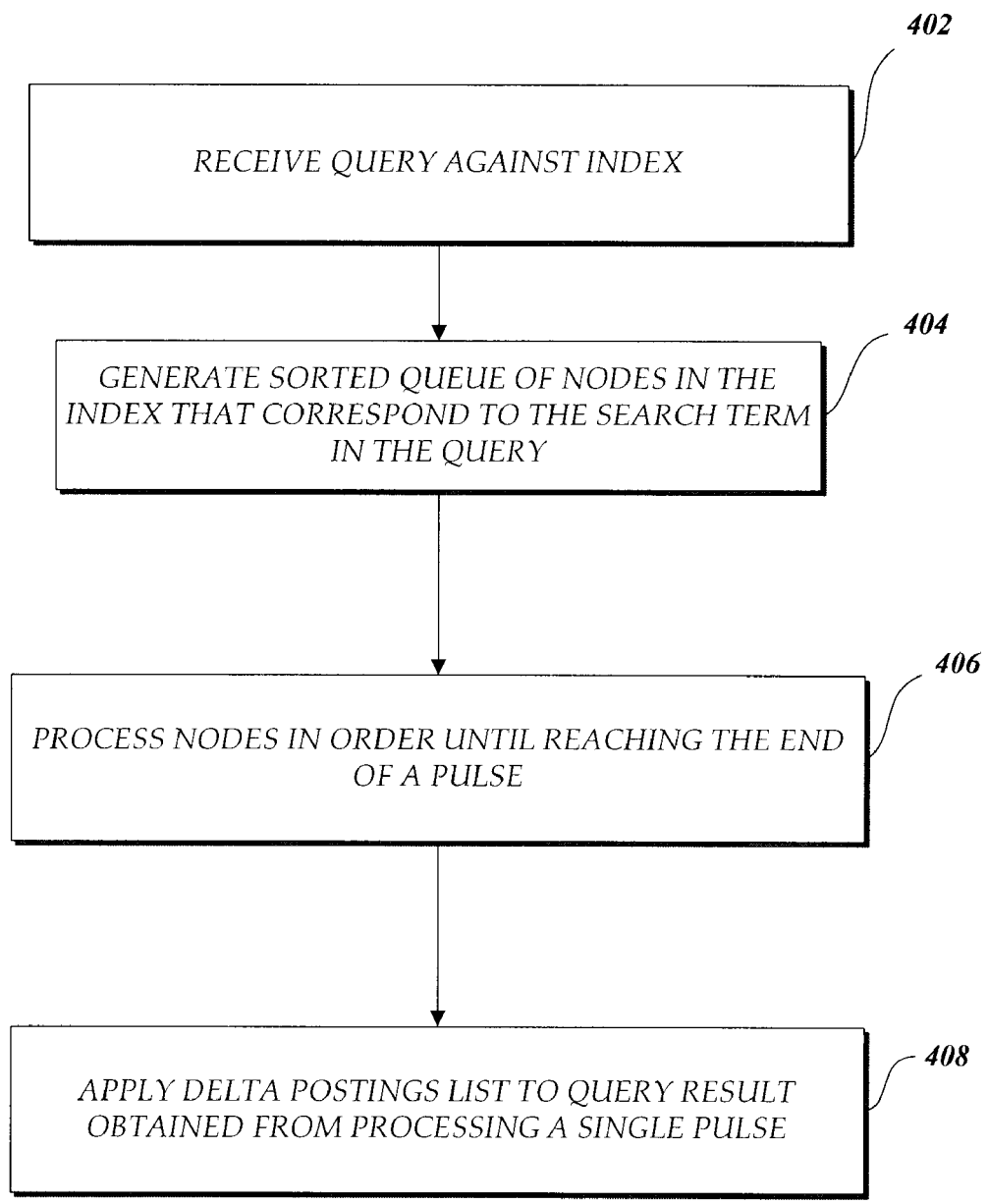
FIG. 4 is a flow diagram illustrating certain aspects of performing a method of processing updates to an index according to one exemplary embodiment of the invention.

FIG. 4 is a flow diagram illustrating certain aspects of performing a method of querying an index according to one exemplary embodiment of the invention. In FIG. 5, the method to be performed begins at block 402, in which an retrieval software receives a query to run against an index containing pulses. At block 404, the retrieval software generates a sorted queue of nodes in the index that correspond to the search term provided in the query. At processing block 406, the nodes are processed in order until reaching the end of the pulse or until no more nodes are left to process. The end of the pulse is detected when the next node in the queue is equal to the closest next node. To finalize the processing of the pulse, the retrieval software keeps track of the range of item ids occurring in a single pulse, and processes item ids up to the highest item id in the current pulse.

Once processing for the current pulse is complete, at block 408, the retrieval software concludes processing by applying available delta postings lists, or live indexes, or other form of updates to the index, to the query result that was obtained in blocks 402-406.

FIG. 5 illustrates an example of a typical computer system which may be used with the present invention. Note that while FIG. 5 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 5 may, for example, be a Macintosh computer from Apple Computer, Inc.

As shown in FIG. 5, the computer system 501, which is a form of a data processing system, includes a bus 502 which is coupled to a microprocessor(s) 503 and a ROM (Read Only Memory) 507 and volatile RAM 505 and a non-volatile memory 506. The microprocessor 503 may be a G3 or G4 microprocessor from Motorola, Inc. or one or more G5 microprocessors from IBM. The bus 502 interconnects these various components together and also interconnects these components 503, 507, 505, and 506 to a display controller and display device 504 and to peripheral devices such as input/output (I/O) devices which may be mice, keyboards, modems, network interfaces, printers and other devices which are well known in the art. Typically, the input/output devices 509 are coupled to the system through input/output controllers 508. The volatile RAM (Random Access Memory) 505 is typically implemented as dynamic RAM (DRAM) which requires power continually in order to refresh or maintain the data in the memory. The mass storage 506 is typically a magnetic hard drive or a magnetic optical drive or an optical drive or a DVD RAM or other types of memory systems which maintain data (e.g. large amounts of data) even after power is removed from the system. Typically, the mass storage 506 will also be a random access memory although this is not required. While FIG. 5 shows that the mass storage 506 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers and/or adapters as is well known in the art. In one embodiment the I/O controller 508 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 507, RAM 505, mass storage 506 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 503.

What is claimed is:

1. A machine implemented method of querying an inverted index, the method comprising:
    storing a postings list of a term as a linked list of one or more nodes, each of the one or more nodes representing an item ID of an item containing the term;
    accumulating the postings list of the term into an update set comprising postings lists of other terms already accumulated;
    periodically flushing the update set to an inverted index to form a pulse in the inverted index, the pulse comprising a group of item IDs not occurring in any other pulse in the inverted index;
    receiving a query against the inverted index;
    processing the query starting with processing a starting node representing an item ID occurring in a current pulse of the inverted index, wherein the starting node is obtained from a sorted queue of nodes representing items containing a search term corresponding to the query;
    continuing processing the query continuing with processing a next node in the inverted index, the next node representing another item ID, the next node being next in the sorted queue of nodes representing items containing the search term corresponding to the query;
    determining that the next node in the sorted queue of nodes is beyond an end of the current pulse in which processing the query began; and
    returning a query result responsive to the query based on processing the nodes in the current pulse.

2. The method of claim 1, wherein determining whether the next node in the sorted queue of nodes is beyond an end of the current pulse is determining that the next node in the sorted queue of nodes is a closest next node, the closest next node being pointed to from the currently processed node.

3. The method of claim 1, further comprising:
    tracking a highest item ID encountered when processing each node in the current pulse; and
    processing all item IDs up to the highest item ID in the current pulse.

4. The method of claim 1, further comprising:
    applying updates to the inverted index to the query result.

5. The method of claim 4, wherein applying updates to the inverted index includes applying a delta postings list for the search term to the query result.

6. A machine-implemented data processing system for querying an inverted index, the system comprising:
    a storage medium for storing a postings list of a term as a linked list of one or more nodes, each of the one or more nodes representing an item ID of an item containing the term;
    a processor coupled to the storage medium, the processor performing logic for:
        accumulating the postings list of the term into an update set comprising postings lists of other terms already accumulated;
        periodically flushing the update set to an inverted index stored on the storage medium, wherein flushing forms a pulse in the inverted index, the pulse comprising a group of item IDs not occurring in any other pulse in the inverted index;

receiving a query against the inverted index;

processing the query staffing with processing a starting node representing an item ID occurring in a current pulse of the inverted index, wherein the starting node is obtained from a sorted queue of nodes representing items containing a search term corresponding to the query;

continuing processing the query continuing with processing a next node in the inverted index, the next node representing another item ID, the next node being next in the sorted queue of nodes representing items containing the search term corresponding to the query;

determining that the next node in the sorted queue of nodes is beyond an end of the current pulse in which processing the query began; and returning a query result responsive to the query based on processing the nodes in the current pulse.

7. The machine-implemented data processing system of claim 6, wherein determining whether the next node in the sorted queue of nodes is beyond an end of the current pulse is determining that the next node in the sorted queue of nodes is a closest next node, the closest next node being pointed to from the currently processed node.

8. The machine-implemented data processing system of claim 6, wherein the processor further performs logic for:
tracking a highest item ID encountered when processing each node in the current pulse; and
processing all item IDs up to the highest item ID in the current pulse.

9. The machine-implemented data processing system of claim 6, wherein the processor further performs logic for applying updates to the inverted index to the query result.

10. The machine-implemented data processing system of claim 9, wherein applying updates to the inverted index includes applying a delta postings list for the search term to the query result.

11. A machine-readable storage medium containing executable program instructions for causing a data processing system to perform a method of querying an inverted index, comprising:
storing a postings list of a term as a linked list of one or more nodes, each of the one or more nodes representing an item ID of an item containing the term;
accumulating the postings list of the term into an update set comprising postings lists of other terms already accumulated;
periodically flushing the update set to an inverted index to form a pulse in the inverted index, the pulse comprising a group of item IDs not occurring in any other pulse in the inverted index;
receiving a query against the inverted index;
processing the query starting with processing a starting node representing an item ID occurring in a current pulse of the inverted index, wherein the starting node is obtained from a sorted queue of nodes representing items containing a search term corresponding to the query;
continuing processing the query continuing with processing a next node in the inverted index, the next node representing another item ID, the next node being next in the sorted queue of nodes representing items containing the search term corresponding to the query;
determining that the next node in the sorted queue of nodes is beyond an end of the current pulse in which processing the query began; and
returning a query result responsive to the query based on processing the nodes in the current pulse.

12. The machine-readable storage medium of claim 11, wherein in the method being performed, determining whether the next node in the sorted queue of nodes is beyond an end of the current pulse is determining that the next node in the sorted queue of nodes is a closest next node, the closest next node being pointed to from the currently processed node.

13. The machine-readable storage medium of claim 11 wherein the method being performed further comprises:
tracking a highest item ID encountered when processing each node in the current pulse; and
processing all item IDs up to the highest item ID in the current pulse.

14. The machine-readable storage medium of claim 11 wherein the method being performed further comprises:
applying updates to the inverted index to the query result.

15. The machine-readable storage medium of claim 14 wherein, in the method being performed, applying updates to the inverted index includes applying a delta postings list for the search term to the query result.

* * * * *

UNITED STATES PATENT AND TRADEMARK OFFICE
CERTIFICATE OF CORRECTION

| | | |
|---|---|---|
| PATENT NO. | : 7,720,860 B2 | Page 1 of 1 |
| APPLICATION NO. | : 11/760707 | |
| DATED | : May 18, 2010 | |
| INVENTOR(S) | : John Martin Hornkvist | |

It is certified that error appears in the above-identified patent and that said Letters Patent is hereby corrected as shown below:

In column 1, line 5, delete "Modem" and insert -- Modern --, therefor.

In column 1, line 18, delete "Modem" and insert -- Modern --, therefor.

In column 7, line 5, in Claim 6, delete "staffing" and insert --starting --, therefor.

Signed and Sealed this
Eighth Day of November, 2011

David J. Kappos
*Director of the United States Patent and Trademark Office*